United States Patent
Andersson

(10) Patent No.: US 7,396,153 B2
(45) Date of Patent: Jul. 8, 2008

(54) ULTRACLEAN MAGNETIC MIXER

(76) Inventor: Per-Olof K. Andersson, 8215 Gina Dr., Racine, WI (US) 53406

( * ) Notice: Subject to any disclaimer, the term of this patent is extended or adjusted under 35 U.S.C. 154(b) by 382 days.

(21) Appl. No.: 11/098,814

(22) Filed: Apr. 5, 2005

(65) Prior Publication Data

US 2006/0221765 A1 Oct. 5, 2006

(51) Int. Cl.
*B01F 13/08* (2006.01)

(52) U.S. Cl. .................................................. 366/273

(58) Field of Classification Search ................ 366/273, 366/274; 416/3
See application file for complete search history.

(56) References Cited

U.S. PATENT DOCUMENTS

| | | | | |
|---|---|---|---|---|
| 3,732,445 | A | * | 5/1973 | Laing ........................... 310/90 |
| 3,871,395 | A | * | 3/1975 | Murry .......................... 134/107 |
| 3,918,689 | A | * | 11/1975 | Gaffal et al. ................. 366/144 |
| 4,209,259 | A | | 6/1980 | Rains et al. |
| 4,993,841 | A | | 2/1991 | Lofgren et al. |
| 5,141,327 | A | * | 8/1992 | Shiobara ...................... 366/274 |
| 5,478,149 | A | * | 12/1995 | Quigg .......................... 366/273 |
| D366,935 | S | | 2/1996 | Arthun et al. |
| 5,758,965 | A | | 6/1998 | Gambrill et al. |
| 5,779,359 | A | | 7/1998 | Gambrill et al. |
| 6,193,409 | B1 | | 2/2001 | Brunson et al. |
| 6,536,774 | B1 | | 3/2003 | Vuksanovic |
| 6,568,844 | B1 | | 5/2003 | Arthun et al. |
| 6,758,593 | B1 | | 7/2004 | Terentiev |
| 6,854,877 | B2 | | 2/2005 | Hoobyar et al. |
| 2002/0041537 | A1 | * | 4/2002 | Yale ............................ 366/273 |
| 2003/0198128 | A1 | * | 10/2003 | Carlson ....................... 366/331 |
| 2004/0047232 | A1 | * | 3/2004 | Terentiev .................... 366/273 |

* cited by examiner

*Primary Examiner*—David L Sorkin
(74) *Attorney, Agent, or Firm*—Jansson Shupe & Munger Ltd.

(57) ABSTRACT

In a magnetically-coupled liquid mixer of the type having a drive mount secured to and extending into a mixing vessel, an external first magnet array adjacent to the drive mount, a stub shaft extending from the drive mount into the vessel and having a first thrust bearing surface, and a driven portion rotatably-mounted on the stub shaft and having a second thrust bearing surface and a second magnet array, the improvement wherein the first and second arrays are positioned with respect to one another such that the first and second thrust bearing surfaces are spaced apart at least in the absence of above-threshold fluid dynamic thrust forces on the driven portion.

20 Claims, 6 Drawing Sheets

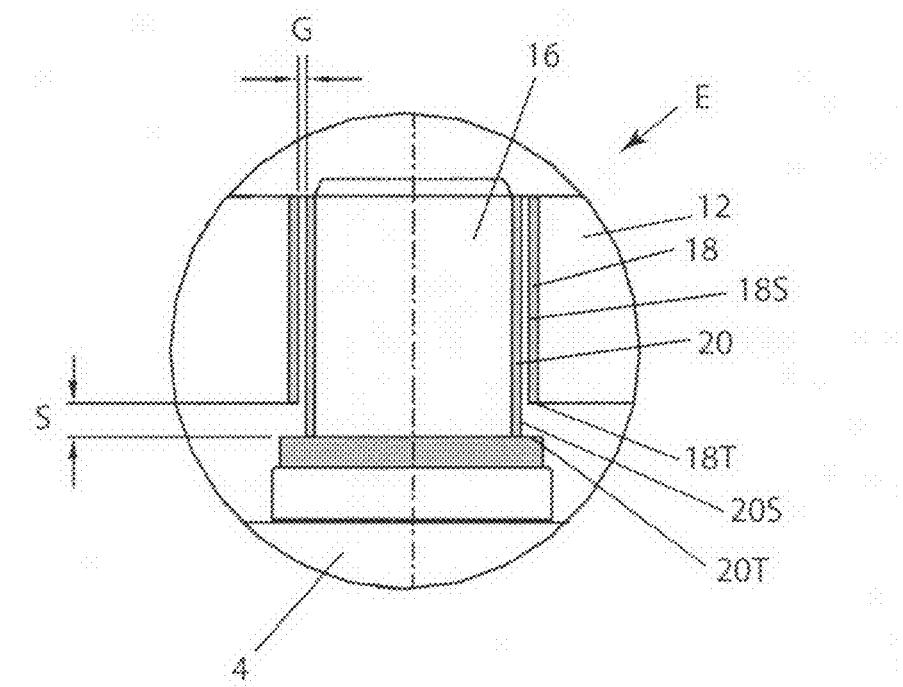
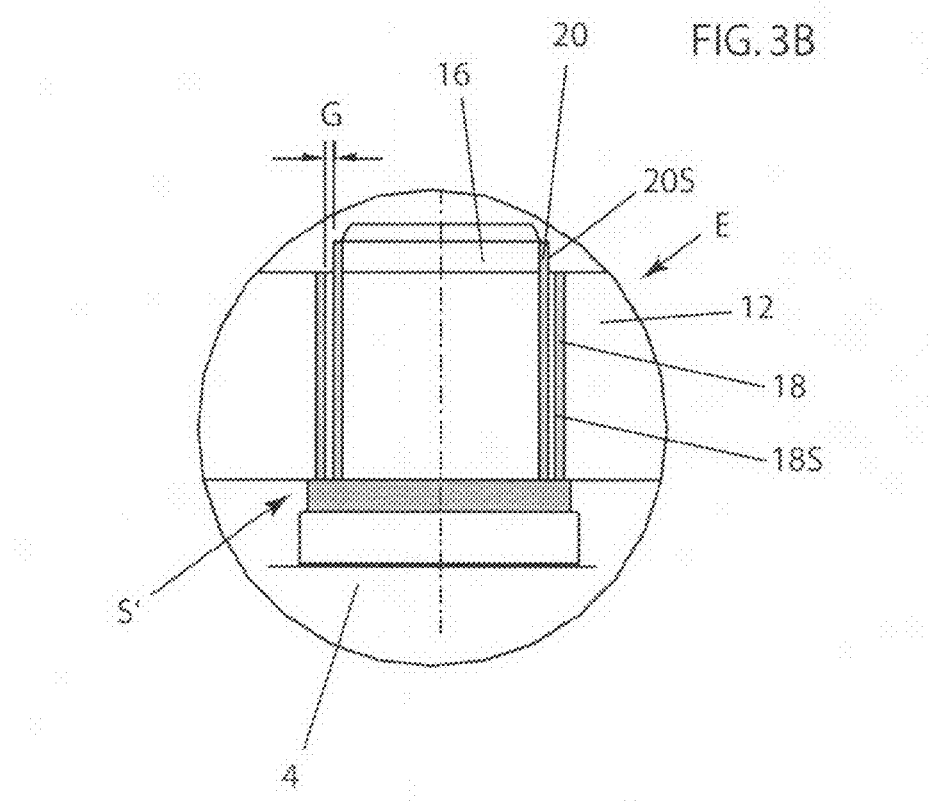

ULTRACLEAN MAGNETIC MIXER

FIELD OF THE INVENTION

This invention relates generally to mixing technology such as is required for the mixing of food products, pharmaceuticals, and chemical products. More particularly, it relates to mixers which are magnetically coupled through the wall of a mixing vessel so that no seal is required in the vessel wall in order to transmit power to the mixer.

BACKGROUND OF THE INVENTION

Many production processes require mixing of liquids in an ultraclean operation. Such production processes may include the mixing of products such as pharmaceuticals, foods and chemicals. Certain of these may require aseptic processing. The term ultraclean as used herein refers in general to particularly stringent requirements for the levels of contamination which are acceptable in such processes.

Contamination in mixing processes may come from a number of sources. Among these are the mixing equipment itself and the cleaning processes which are invariably required during the use of such equipment.

One source of contamination comes from seals which may be required to seal a piece of equipment which must penetrate into the mixing vessel. Seals may be required, for example, around a rotary drive shaft to drive a mixer in the vessel. For this and other reasons, elimination of such seals is highly desirable. A mixer disclosed in U.S. Pat. No. 4,993,841 (Lofgren et al.) is an example of a mixer which eliminates the seal through the use of magnetic coupling of the rotary power in the mixer. Other mixer systems which use magnetic coupling to eliminate such seals are disclosed in the following U.S. Pat. No. 4,209,259 (Rains et al.); U.S. Pat. No. 5,79,359 (Gambrill et al.); U.S. Pat. No. 5,758,965 (Gambrill et al.); U.S. Pat. No. 6,568,844 (Arthun et al.); and U.S. Pat. No. 6,854,877 (Hoobyar et al.).

Another source of contamination is the relative movement of bearing surfaces against one another. This is particularly true when the bearing surfaces are not surrounded by liquid to provide lubrication to the bearing surfaces. When a mixing vessel is nearly empty of the product being mixed (mixing typically takes place while the product is being transferred from the mixing vessel into other containers), the bearing surfaces within the mixer run "dry." During this period of operation, wear particles are more easily generated and then find their way into the product, either in the current batch of product or in a subsequent batch.

The cleaning of the mixing vessel and other equipment is also a source of contamination. Product which may spoil can become trapped in areas which are hard to reach during the cleaning process. Thus, it is desirable to be able to reach every area within a piece of equipment with the cleaning fluid being used. Sterilization as part of the cleaning process also requires the equipment to withstand high temperatures.

Current magnetically-coupled mixers, while eliminating the penetration of the mixing vessel from a drive shaft, still produce contamination caused by dry bearing contact, and because of such bearing contact, also contain areas within the mixer which are difficult to clean.

It is also desirable is such mixers to be able to transfer a high level of rotational mechanical energy into the fluid being mixed. Under such conditions, the fluid dynamic forces on the mixing element can be both large and rapidly changing due to such variables as high liquid viscosity, high mixing rates, and turbulence. Under such conditions, it is necessary that the mixing element be well supported by the bearings within the mixer and that the strength of the magnetic coupling be high enough to transmit the required driving forces, particularly during periods of high acceleration.

OBJECTS OF THE INVENTION

It is an object of this invention to provide a magnetically-coupled mixer for liquids which overcomes the problems and shortcomings of the prior art.

Another object of this invention is to provide a magnetically-coupled liquid mixer which eliminates contamination of the liquid.

Another object of this invention is to provide a magnetically-coupled liquid mixer which eliminates wear of the thrust bearing when the thrust bearing is not submerged in the liquid being mixed.

Another object of this invention is to provide a magnetically-coupled liquid mixer in which the driven portion of the mixer is well-supported when the driven portion is loaded by the fluid dynamic forces from the liquid being mixed.

Another object of this invention is to provide a magnetically-coupled liquid mixer which enables the mixer to be fully cleaned while being operated in the mixing vessel in which the mixer is mounted.

Yet another object of this invention is to provide a magnetically-coupled liquid mixer which allows liquid to flow through all areas of the mixers to facilitate cleaning.

Still another object of this invention is to provide a magnetically-coupled liquid mixer which can withstand the high temperature conditions of the cleaning cycles required for the mixer.

These and other objects of the invention will be apparent from the following descriptions and from the drawings.

SUMMARY OF THE INVENTION

The instant invention overcomes the above-noted problems and shortcomings and satisfies the objects of the invention. The invention is an improved magnetically-coupled mixer for liquids Of particular note is that the instant invention provides a mixer which practically eliminates bearing wear and therefore contamination of the liquid being mixed while providing good bearing support for the rotatably-driven portion of the mixer when the driven portion experiences the fluid dynamic forces caused by mixing viscous liquids at higher rates of rotation.

The mixer for liquids is a magnetically-coupled mixer of the type which includes (a) a drive mount secured to and extending into a mixing vessel, (b) an external first magnet array adjacent to the drive mount, (c) a stub shaft extending from the drive mount into the vessel and having a first thrust bearing surface, and (d) a driven portion rotatably-mounted on the stub shaft and having a second thrust bearing surface and a second magnet array. The improvement includes positioning the first and second magnet arrays with respect to one another in the mixer such that the first and second thrust bearing surfaces are spaced apart at least in the absence of above-threshold fluid dynamic thrust forces on the driven portion. In other words, when the thrust forces on the driven portion of the mixer are below the magnetic force parallel to the axis of the stub shaft around which the driven portion rotates, the driven portion is magnetically held in a position such that the first and second thrust bearing surfaces do not contact one another.

In highly preferred embodiments of the inventive mixer, the first and second magnet arrays are positioned with respect to one another such that the first and second thrust bearing surfaces contact one another in the presence of above-threshold fluid dynamic thrust forces on the driven portion. Under such forces, i.e., when the fluid-dynamic forces on the driven portion are greater than the magnetic force parallel to the axis of the stub shaft, contact between the first and second thrust bearing surfaces provides stable support for the driven portion experiencing a variety of forces from both the magnetically-coupled driving forces and the fluid dynamic forces from the liquid being mixed.

In certain preferred embodiments of the inventive mixer, the space between the first and second thrust bearing surfaces is between 0.005 and 0.040 inches.

In some embodiments of the invention, the driven portion includes a plurality of radially-mounted mixing blades. In some of such embodiments, the mixing blades are curved. Also, in some embodiments, the driven portion includes four or more four mixing blades. In particular, some embodiments include eight mixing blades.

In certain embodiments of the invention, some of the mixing blades are long blades and some are short blades.

In highly preferred embodiments, the driven portion further includes a sleeve bearing having an end which forms the second thrust bearing surface and the sleeve bearing surrounds a portion of the stub shaft with a gap therebetween. In such embodiments, some of the liquid flows through the gap and between the first and second thrust bearing surfaces. In some such embodiments, the gap is 0.001 to 0.003 inches.

In other highly preferred embodiments of the inventive mixer, the driven portion further includes a central cylinder within which the sleeve bearing is mounted and an outer cylinder in which the second magnet array is mounted. The two cylinders form an annular opening therebetween, thereby allowing liquid to flow through the annular opening and between the driven portion and the drive mount.

In certain embodiments of the inventive mixer, the second magnet array is secured in the driven portion with high-temperature epoxy.

Note that the term "liquid" as used herein includes all types of fluids which are to be mixed in various ways including but not limited to agitating, stirring, blending, suspending, homogenizing, shearing, dispersing, and aerating. Also, the term "liquid" as used herein includes fluids containing solid particles.

BRIEF DESCRIPTION OF THE DRAWINGS

FIG. 3A is an enlargement of a portion of the mixer of FIG. 1 (as indicated in FIG. 1), with the first and second thrust bearing surfaces in spaced-apart positions.

FIG. 3B is an enlargement of the same portion of the mixer of FIG. 1, with the first and second thrust bearing surfaces in contact with one another.

DETAILED DESCRIPTION OF PREFERRED EMBODIMENTS

Figure 1:
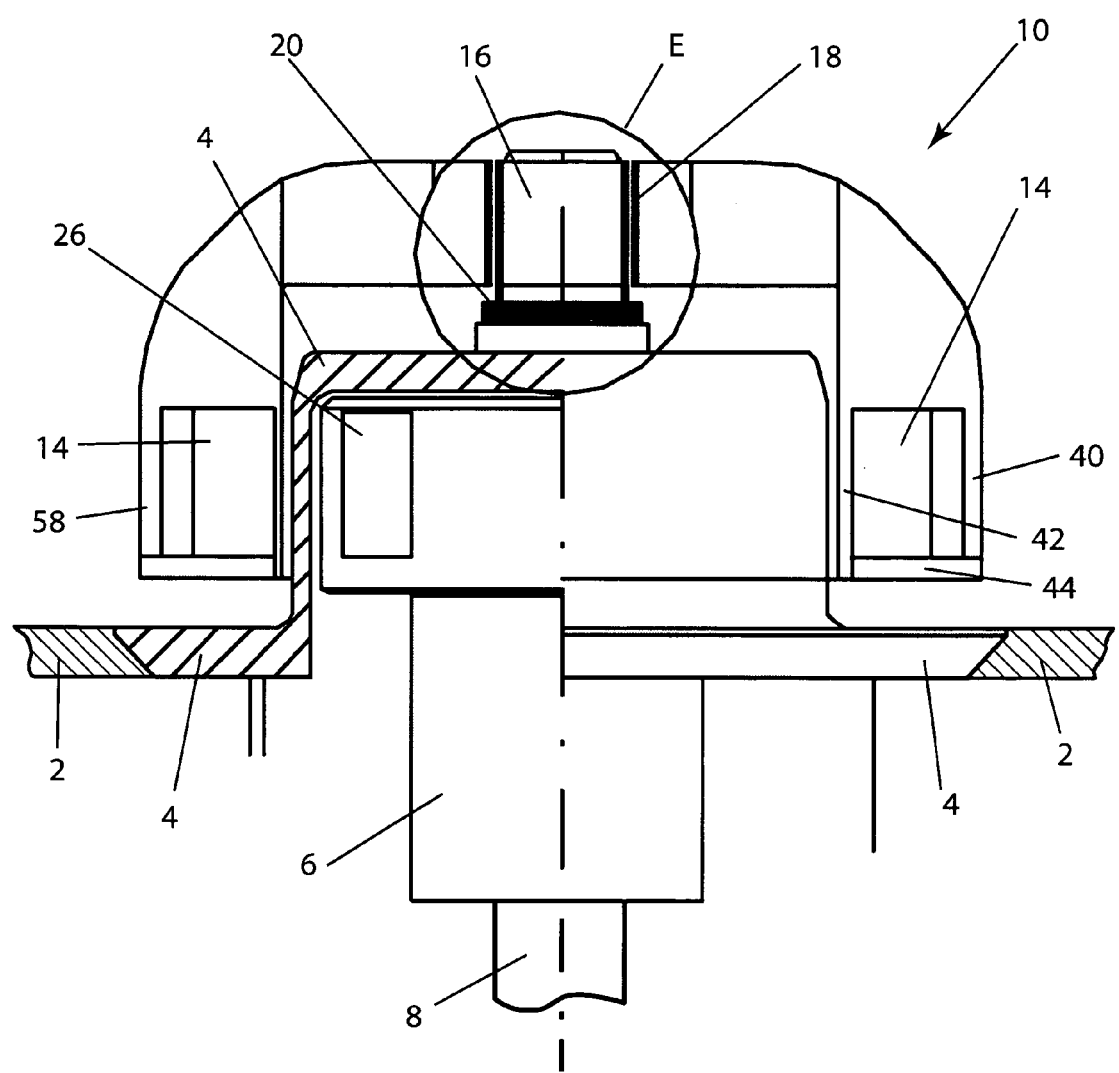
FIG. 1 is a partial schematic drawing of one embodiment of the inventive mixer, shown as a side view. Certain elements of the mixer have been left out of the drawing for clarity, and portions of the schematic are shown as cutaways.

FIG. 1 shows one embodiment of a magnetically-coupled liquid mixer 10. In FIGS. 1-6, magnetically-coupled liquid mixer 10 and its various elements are largely shown in highly schematic fashion. In FIG. 1, for example, certain elements such as the rotary power source for driving mixer 10 through a drive shaft 8 and the mixing elements (e.g., blades) attached to a driven portion 12 of mixer 10 have been left out of the figure to simplify the description of the present invention. Both the rotary power source and the form of the mixing elements can vary significantly. For example, the rotary power source may be an electric motor, a pneumatic motor, a hydraulic motor, or any other appropriate source of rotary power. The mixing elements may be, for example, impeller blades of the form illustrated in FIGS. 4A-4D or any other appropriate elements such those with sharp edges for shearing the fluid being mixed.

Referring again to FIG. 1, mixer 10 is mounted to a mixing vessel 2 through a drive mount 4, a portion of which extends into vessel 2. For example, drive mount 4 may be welded in an opening of vessel 2 as illustrated in FIG. 1. The rotary power source (not shown) drives mixer 10 through drive shaft 8 which is fixed to a drive hub 6. Drive hub 6 includes a first magnet array 26 comprising a plurality of magnets also indicated by reference number 26 in the figures.

A stub shaft 16 is mounted on drive mount 4. A stub shaft bearing 20 is affixed to stub shaft 16 to provide a suitable load-bearing surface 20S and a first thrust bearing surface 20T (see FIGS. 3A and 3B) for the rotary motion of driven portion 12. (Hereinafter, driven portion 12 will be referred to as an impeller hub, e.g., as hub 12, appropriate for the particular embodiment described herein.)

Several elements are mounted to hub 12 including a hub bearing 18 and a second magnet array 14. Bearings 18 and 20 preferably are made of a carbide compound such as tungsten carbide or silicon carbide which have excellent wear and chemical properties suitable for most applications of mixer 10. Other bearing materials can also be used when needed for other applications. Bearings 18 and 20 can be secured to stub shaft 16 and hub 12, respectively, using a high-temperature epoxy such as FDA-approved EPO-TEK 353ND made by Epoxy Technology, Inc., 14 Fortune Drive, Billerica, Mass., 01821-3972, or any other suitable adhesive.

Figure 2:
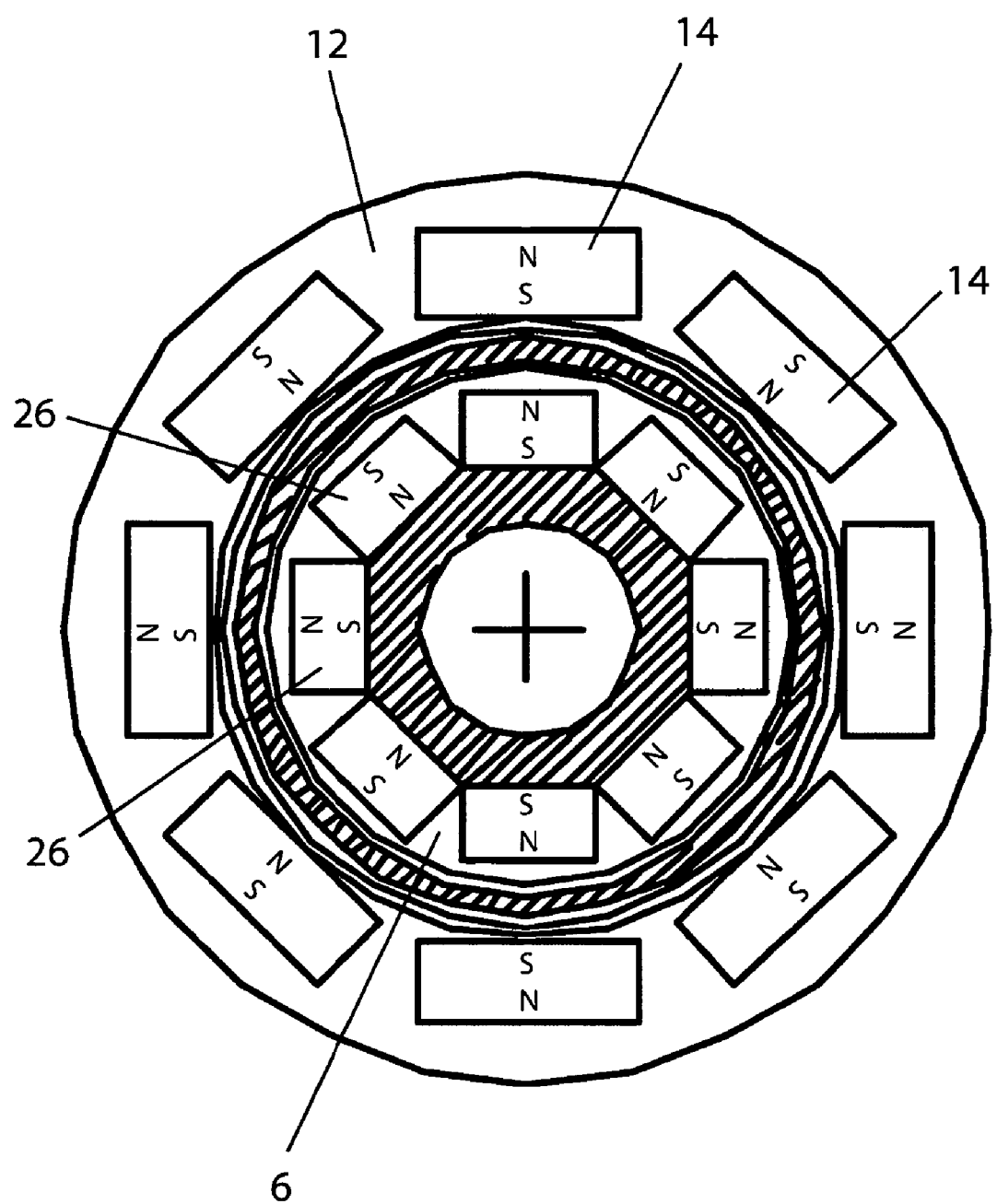
FIG. 2 is a schematic cross-sectional drawing without background showing the relative positions of the first and second magnet arrays of the mixer of FIG. 1.

Drive hub 6 is positioned in mixer 10 adjacent to drive mount 12 such that the magnetic forces between first magnet array 26 and second magnet array 14 (in hub 12) position hub 12 on stub shaft 16 with a space S (see FIG. 3A) between first thrust bearing surface 20T and second thrust bearing surface 18T. FIG. 2 schematically illustrates the positioning as viewed from the top or bottom of mixer 10. First and second magnet arrays 26 and 14 each contain an even number of permanent magnets (also individually labeled by the array reference numbers). Within each array, the same number of individual magnets are arranged evenly spaced circumferentially in circular fashion with their magnetic fields alternatingly aligned N-to-S and S-to-N with the radial direction as illustrated in FIG. 2. Hub 12 then is positioned by the magnetic field forces in the plane of FIG. 2 as shown in FIG. 2 and perpendicular to the plane of FIG. 2 along the axis of stub shaft 16 as shown in FIG. 1.

The individual magnets in first and second magnet arrays 26 and 14 are preferably rare earth magnets. Such magnets provide particularly strong magnetic forces, desirable to drive hub 6 and hub 12 under heavy mixing loads and higher accelerations. Suitable rare earth magnets may be obtained from Arnold Magnetic Technologies, 770 Linder Avenue, Rochester, N.Y. 14625.

FIGS. 3A and 3B are enlargements of the region E in FIG. 1 illustrating the relative positioning of bearings 18 and 20. When mixer 10 is not in operation (or lightly loaded), hub 12 is positioned such that space S exists between surfaces 18T and 20T as shown in FIG. 3A. Space S is preferably between 0.005 and 0.040 inches. When hub 12 is driven in rotary fashion in a liquid, fluid dynamic forces are placed on hub 12 by the fluid. Some of those forces are thrust forces in the direction of the axis of stub shaft 6, pushing hub 12 further down stub shaft 6. The level of such thrust forces depends on a number of variables such as the viscosity of the liquid being mixed, the rotational speed and acceleration of hub 12, and the level of turbulence in the liquid. The magnetic field forces between first and second magnet arrays 26 and 14 are such that a component of the magnetic forces oppose the fluid dynamic thrust forces. A threshold fluid dynamic thrust force is defined as that which overcomes the magnetic forces just enough to drive hub 12 down to completely close space S as illustrated in FIG. 3B in which such closed space is represented by the symbol S'.

The function of space S is to provide operation of mixer 10 under below-threshold forces such that (1) no wear particles are produced due to contact between first and second thrust bearing surfaces 20T and 18T, and (2) liquid can flow through space S to avoid stagnation of any liquid in the region around space S and to enable cleaning of such region when vessel 2 and mixer 10 undergo cleaning. In particular, wear between bearing surfaces is exacerbated by mixer 10 operating without the presence of liquid. This can occur when the level of the liquid product in vessel 2 falls below the level of the thrust bearing surfaces or when vessel 2 is cleaned. Since the products mixed in vessel 2 are often highly valuable, it is imperative that vessel 2 be able to be emptied completely in order to utilize all of such product. This emptying process therefore often causes mixer 10 to be operated in such a "dry" condition. In the same way, a during at least a portion of the vessel cleaning process, mixer 10 operates in a "dry" condition. Space S of the present invention prevents wear particles from being generated in such a "dry" condition.

Further, the function of space S is such that when the fluid dynamic thrust forces are above the threshold, space S is completely closed as represented by S' in FIG. 3B, thereby providing stable thrust-bearing support to hub 12 under operating conditions during which it is most desirable to have such stability.

Again referring to FIG. 3A, hub bearing 18 and sleeve bearing 20 have bearing surfaces 18S and 20S, respectively. Bearing surfaces 18S and 20S provide support for hub 12 against the non-thrust loads on hub 12. Bearings 18 and 20 are preferable sized such that a gap G exists between bearing surfaces 18S and 20S. Gap G is preferably between 0.001 and 0.003 inches. The function of gap G is to minimize the wobbling motion of hub 12 while allowing liquid to flow through gap G in order (1) to prevent stagnation of liquid in the region of gap G and (2) to enable cleaning in the region of gap G.

The combined functions of space S and gap G enable mixer 10 to provide stable ultraclean operation in liquids which require ultraclean mixing. Both wear particles and inadequate cleaning are sources of contamination which it is desirable to eliminate from the mixing of products such as pharmaceuticals and certain food products.

Figure 4A:
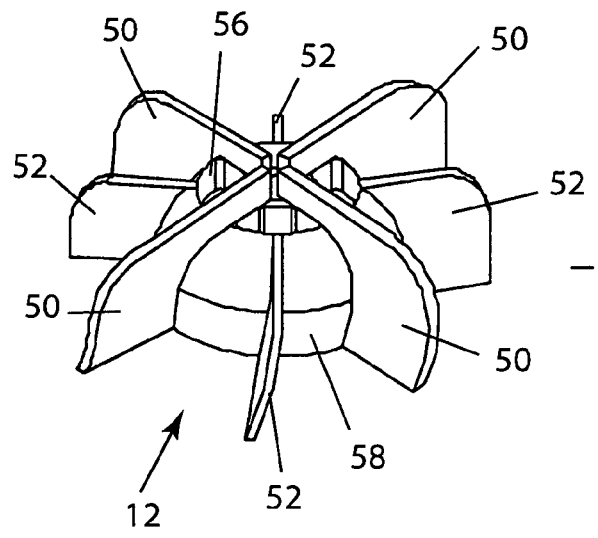
FIG. 4A is a perspective drawing of one embodiment of the driven portion of the mixer of FIG. 1.

FIGS. 4A-4D illustrate one embodiment of driven portion 12 of mixer 10. FIG. 4A is a perspective view of hub 12. Hub 12 includes four long blades 50 and four short blades 52. In this embodiment, blades 50 and 52 are curved to create a desired mixing flow in vessel 2. Hub 12 is driven in rotary fashion in a clockwise direction in FIG. 4A. Center portion 56 of hub 12 is open to allow liquid to reach gap G and space S easily. Center portion 56 is an annular opening between a central cylinder 60 into which bearing 18 is secured and an outer cylinder 58 in which second magnet array 14 is mounted (also see FIGS. 1 and 5). Center cylinder 60 and outer cylinder 58 are held in such spaced-apart fashion with four web spokes 64 as shown in the bottom view of FIG. 4C.

Figure 4B:
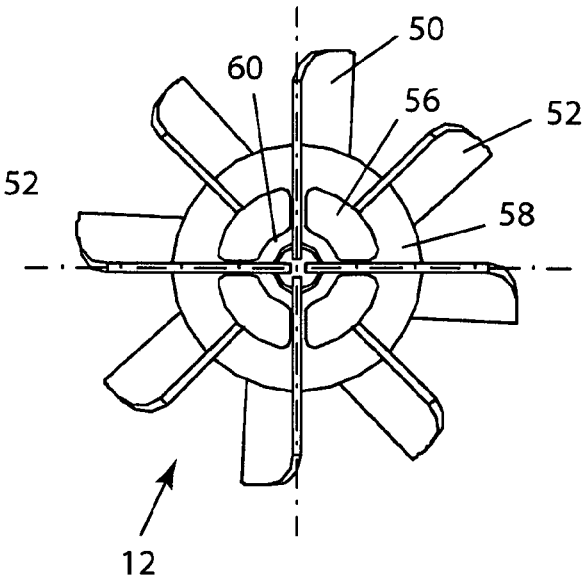
FIG. 4B is a top view of the driven portion of FIG. 4A.
Figure 4C:
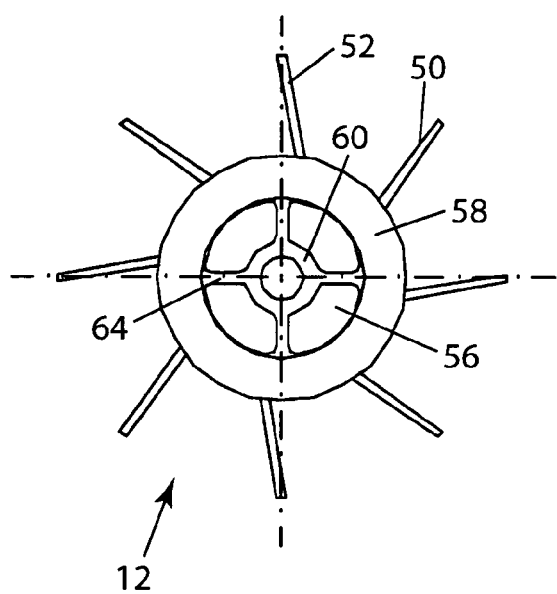
FIG. 4C is a bottom schematic cross-sectional drawing without background of the driven portion of FIG. 4A.
Figure 4D:
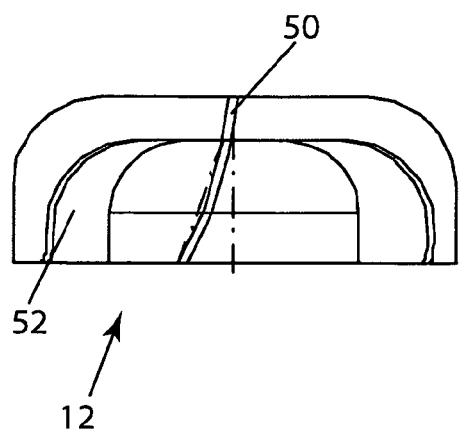
FIG. 4D is a schematic side view of the driven portion of FIG. 4A.

FIGS. 4B-4D provide further illustration of the embodiment of hub 12 of FIG. 4A with top (FIG. 4B), bottom (FIG. 4C), and side (FIG. 4D) views. FIG. 4C is a bottom plane cross-sectional. Note that the purpose of FIG. 4D is primarily to illustrate the curved shape of long blades 50.

Figure 5:
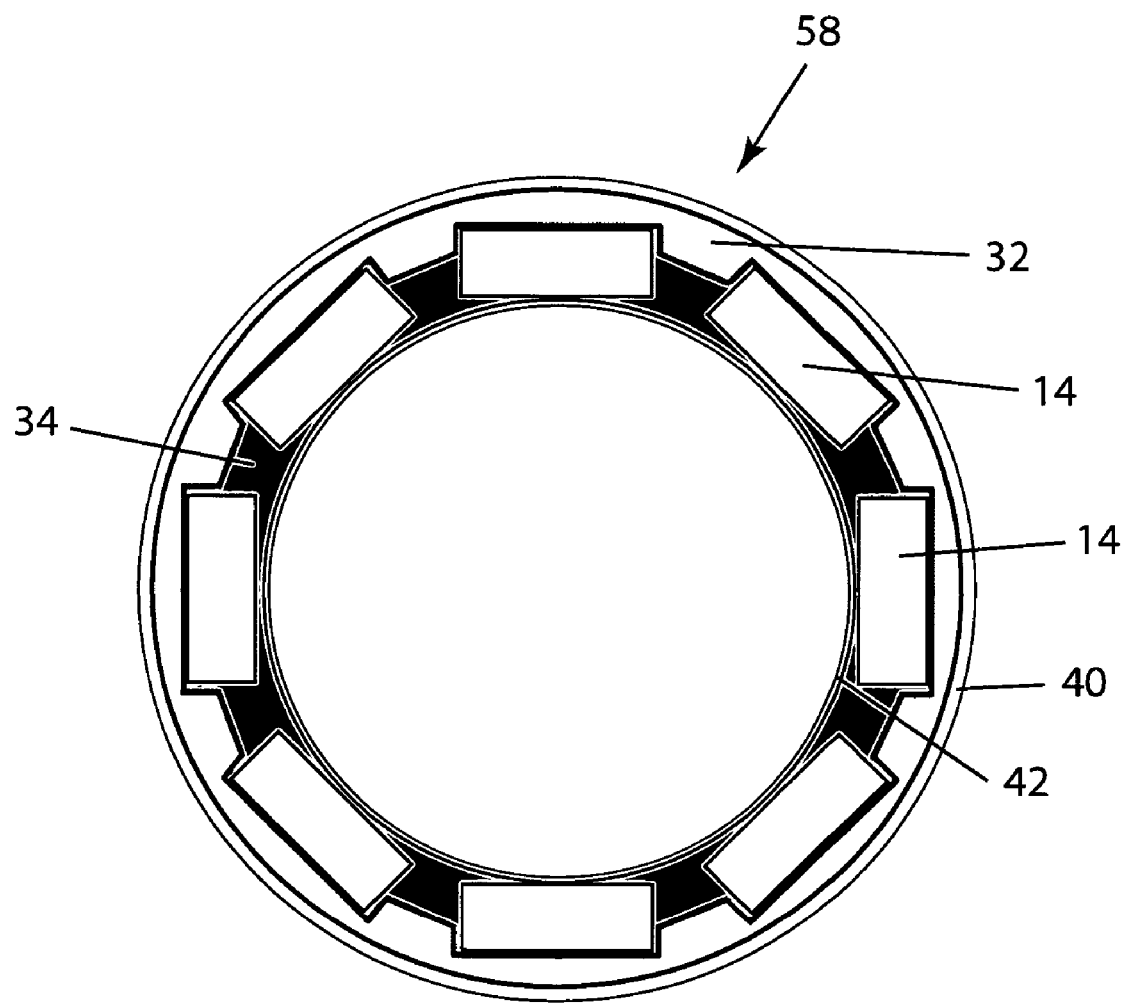
FIG. 5 is a schematic cross-sectional drawing without background illustrating the second magnet array secured in the driven portion of the mixer of FIG. 1.

FIG. 5 illustrates schematically how the second magnet array 14 can be secured in hub 12. FIG. 5 only shows the elements of hub 12 related to such securing of second magnet array 14; outer cylinder 58 of hub 12 is the portion of hub 12 into which second magnet array 14 is secured. A retaining ring 32 is placed in between hub walls 40 and 42 (also shown in FIG. 1). Ring 32, made of carbon steel, serves to hold magnets 14 in place during assembly and to provide a low-reluctance magnetic flux path for second magnet array 14. A high-temperature epoxy 34 is poured around second magnet array 14 and when set, the epoxy holds second magnet array 14 in place. High-temperature epoxy 34 may be any suitable epoxy such as Duralco NM25 magnet bonding adhesive made by Cotronics Corporation, 3379 Shore Parkway, Brooklyn, N.Y., 11235. Second magnet array 14 is then sealed completely within outer cylinder 58 of hub 12 by the affixing of ring 44 to walls 42 and 44. All of the external portions of hub 12 as well as those of drive mount 4 are preferable made of stainless steel but may be made of any suitable material depending on the application of mixer 10.

Figure 6:
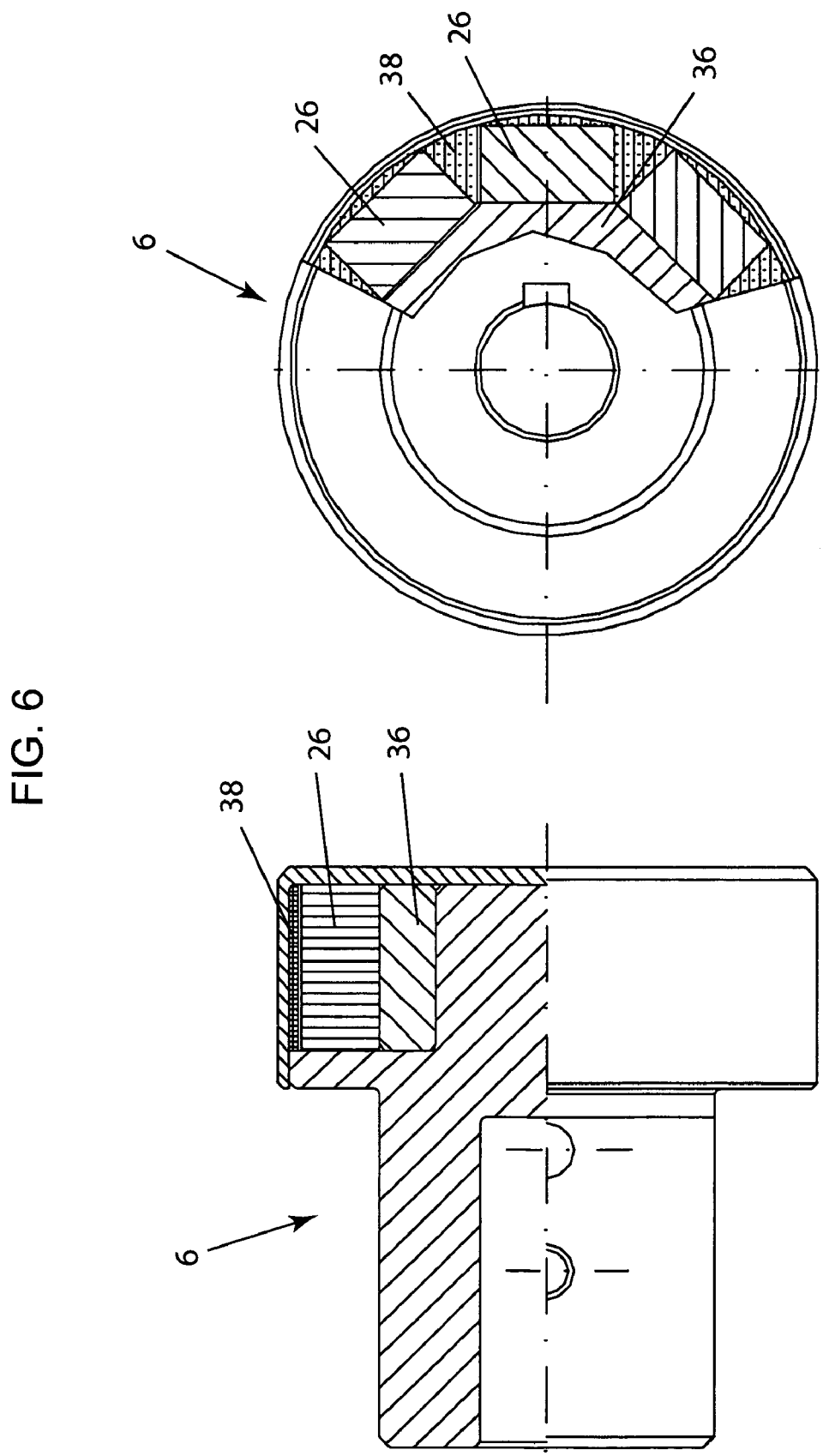
FIG. 6 includes side and top elevation views of mixer element containing the first magnet array of the mixer of FIG. 1.

FIG. 6 illustrates how the first magnet array 26 can be secured in drive hub 6. First magnet array 26 is held in place in a fashion similar to second magnet array 14. A retaining form 36 is shaped to position the individual magnets of first magnet array 26 in place during assembly. Form 36, made of carbon steel, also provides a low-reluctance magnetic flux path for first magnet array 26. High-temperature epoxy 38 is poured around first magnet array 26. When epoxy 38 sets, it holds first magnet array 26 in place within drive hub 6. Epoxy 38 may be the same product as that used to secure second magnet array 14 in hub 12.

While the principles of this invention have been described in connection with specific embodiments, it should be understood clearly that these descriptions are made only by way of example and are not intended to limit the scope of the invention.

The invention claimed is:

1. In a magnetically-coupled liquid mixer of the type having: (A) a drive mount secured to and extending into a mixing vessel; (B) an external first magnet array adjacent to the drive mount; (C) a stub shaft extending from the drive mount into the vessel and having a first thrust bearing surface; and (D) a driven portion rotatably-mounted on the stub shaft and having a second thrust bearing surface and a second magnet array, the improvement wherein the first and second arrays are positioned with respect to one another such that the first and second thrust bearing surfaces are spaced apart at least in the absence of above-threshold fluid dynamic thrust forces on the driven portion.

2. The mixer of claim 1 wherein the space between the first and second thrust bearing surfaces is between 0.005 and 0.040 inches.

3. The mixer of claim 1 wherein the driven portion includes a plurality of radially-mounted mixing blades.

4. The mixer of claim 3 wherein the mixing blades are curved.

5. The mixer of claim 3 wherein the driven portion includes four or more mixing blades.

6. The mixer of claim 5 wherein the driven portion includes eight mixing blades.

7. The mixer of claim 5 wherein some of the mixing blades are long blades and some are short blades.

8. The mixer of claim 1 wherein the driven portion further includes a sleeve bearing having an end which forms the second thrust bearing surface, the sleeve bearing surrounding a portion of the stub shaft with a gap therebetween, whereby liquid flows through the gap and between the first and second thrust bearing surfaces.

9. The mixer of claim 8 wherein the gap is 0.001 to 0.003 inches.

10. The mixer of claim 8 wherein the driven portion further includes:
   a central cylinder within which the sleeve bearing is mounted; and
   an outer cylinder in which the second magnet array is mounted, the two cylinders forming an annular opening therebetween,
whereby liquid flows through the annular opening and between the driven portion and the drive mount.

11. The mixer of claim 1 wherein the second magnet array is secured in the driven portion with high-temperature epoxy.

12. The mixer of claim 1 wherein the first and second magnet arrays are positioned with respect to one another such that the first and second thrust bearing surfaces contact one another in the presence of above-threshold fluid dynamic thrust forces on the driven portion.

13. The mixer of claim 12 wherein the space between the first and second thrust bearing surfaces is between 0.005 and 0.040 inches.

14. The mixer of claim 12 wherein the driven portion includes a plurality of radially-mounted mixing blades.

15. The mixer of claim 14 wherein the mixing blades are curved.

16. The mixer of claim 14 wherein the driven portion includes four or more four mixing blades.

17. The mixer of claim 16 wherein the driven portion includes eight mixing blades.

18. The mixer of claim 12 wherein the driven portion further includes a sleeve bearing having an end which forms the second thrust bearing surface, the sleeve bearing surrounding a portion of the stub shaft with a gap therebetween, whereby liquid flows through the gap and between the first and second thrust bearing surfaces.

19. The mixer of claim 18 wherein the gap is 0.001 to 0.003 inches.

20. The mixer of claim 18 wherein the driven portion further includes:
   a central cylinder within which the sleeve bearing is mounted; and
   an outer cylinder in which the second magnet array is mounted, the two cylinders forming an annular opening therebetween,
whereby liquid flows through the annular opening and between the driven portion and the drive mount.

* * * * *